US006753808B2

(12) United States Patent
Lee et al.

(10) Patent No.: US 6,753,808 B2
(45) Date of Patent: Jun. 22, 2004

(54) SYSTEM AND METHOD FOR MONITORING AND MANAGING LOGISTICS EMPLOYING GLOBAL POSITIONING SUBSYSTEM

(75) Inventors: Alex Lee, Tu-chen (TW); David Luo, Tu-Chen (TW); Cheng-Min Hu, Tu-Chen (TW); Xiaobing Yang, Shenzhen (CN)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 10/172,162

(22) Filed: Jun. 13, 2002

(65) Prior Publication Data

US 2003/0151546 A1 Aug. 14, 2003

(30) Foreign Application Priority Data

Feb. 8, 2002 (TW) ........................................ 91102463 A

(51) Int. Cl.[7] .................................................. G01S 5/14
(52) U.S. Cl. .................................................. 342/357.07
(58) Field of Search ....................... 342/357.07, 357.09, 342/357.1

(56) References Cited

U.S. PATENT DOCUMENTS 6,282,491 B1 * 8/2001 Bochmann et al. .... 342/357.09
6,339,745 B1 * 1/2002 Novik ................... 342/357.07
6,411,891 B1 * 6/2002 Jones ..................... 342/357.07
6,429,810 B1 * 8/2002 De Roche .............. 342/357.07
6,502,030 B2 * 12/2002 Hilleary ................. 342/357.09
6,510,380 B1 * 1/2003 Curatolo et al. ....... 342/357.07
6,531,982 B1 * 3/2003 White et al. ........... 342/357.09
2002/0052687 A1 * 5/2002 Doyle ................... 342/357.07
2003/0083815 A1 * 5/2003 Denton .................. 342/357.07
2003/0109988 A1 * 6/2003 Geissler et al. ........ 342/357.07

FOREIGN PATENT DOCUMENTS

DE 19646603 A1 * 7/1997 ............ H04Q/7/32

OTHER PUBLICATIONS

T. Nathanail, Architectural design for the monitoring of intermodal transportation of hazardous goods, Proceedings of the 1995 Pacific Rim TransTech Conference, pp. 69–73, 1995.*

M.H. Eom et al., Implementation of Internet–based land vehicle tracking system using Java, Proceedings of the 2001 International Conference on Info–tech and Info–net, vol. 1, pp. 52–57, 2001.*

* cited by examiner

*Primary Examiner*—Thomas H. Tarcza
*Assistant Examiner*—Fred H Mull
(74) *Attorney, Agent, or Firm*—Wei Te Chung

(57) ABSTRACT

A system and method for monitoring and controlling transportation of material. The system comprises a central managing device (130), a vehicle information inputting device (110), a material information inputting device (120), a central monitoring device (400), and a global positioning subsystem. Information input through the vehicle information inputting device and the material information inputting device is stored in the central managing device and can be accessed by the central monitoring device. Information on a current location of a vehicle (180) transporting material is sent to a web server (150) via the global positioning subsystem and accessed by the central monitoring device. The central monitoring device can control logistics by checking whether the current location of the vehicle is along a predetermined route of the vehicle.

10 Claims, 8 Drawing Sheets

200 Vehicle Info. Table 210 220 230 240 250

| License Plate No. | Owner of Vehicle | Vehicle Group | Type of Vehicle | SIM No. |
|---|---|---|---|---|
| X12345 | Fox Co. | Fox | Truck | 86138231 |
| ⋮ | ⋮ | ⋮ | ⋮ | ⋮ |

FIG. 2

300 Material Info. Table

| BOM No. (310) | Order No. (320) | Material No. (330) | Material Name (340) | Units (350) | Qty. (360) | Route (370) | License Plate No. (210) |
|---|---|---|---|---|---|---|---|
| E1-140130 | GQ-12019 | 3S225-002A | Plate | pc | 3000 | A→B→C | X12345 |
| . . . | . . . | . . . | . . . | . . . | . . . | . . . | . . . |

FIG. 3

SYSTEM AND METHOD FOR MONITORING AND MANAGING LOGISTICS EMPLOYING GLOBAL POSITIONING SUBSYSTEM

BACKGROUND OF THE INVENTION

1. Field of the Invention

The present invention relates to a system and method for monitoring and managing logistics, and especially to a system and method for managing vehicular transportation of material by employing a global positioning subsystem.

2. Background of the Invention

Managing logistics is becoming increasingly important for an enterprise to operate smoothly. Logistics is key to reducing costs and improving competitive strength. Many enterprises are now actively modernizing their logistics management to better control the flow of material and products. In particular, enterprises are seeking to track the flow of material and products in real time.

Tracking technology employing global positioning systems has already been extensively developed. U.S. Pat. No. 5,225,842 discloses a vehicle tracking system employing global positioning system (GPS) satellites. FIG. 9 schematically shows the infrastructure of this vehicle tracking system. A GPS reference receiver 94 receives signals provided by a plurality of GPS satellites 90 (only one shown), and generates sensor commands to be sent to a vehicle location system (VLS) workstation 95 via a communication link 96. At the same time, a sensor 91 on a vehicle 92 receives signals sent from the GPS satellites 90, and sends the signals to the VLS workstation 95 via a data link 93 and the communication link 96. By combining the signals sent respectively from the sensor 91 and the GPS reference receiver 94, the VLS workstation 95 can calculate the location of the vehicle 92.

By using recently-developed network technology, functions of the VLS workstation 95 can now be performed by a server of a communications network. A typical vehicle tracking system can now process more data than ever before, enabling more vehicles to be monitored by such system.

However, the system disclosed in U.S. Pat. No. 5,225,842 is still relatively rudimentary. The locating technology as disclosed does not enable transportation of material to be closely controlled and corrected where necessary. In particular, there are no means for retracing an actual route traveled by a particular vehicle, and no means for alerting a central controller when a particular vehicle travels along an incorrect route. The current technology cannot ensure smooth operation and control of logistics for an enterprise.

SUMMARY OF THE INVENTION

It is a general object of the present invention to provide a system and method for monitoring and managing logistics by monitoring vehicles transporting material using a global positioning subsystem.

It is another object of the present invention to provide a system and method for monitoring and managing logistics whereby an alarm is activated if a vehicle does not travel along a predetermined route, and whereby a route traveled by a vehicle can be conveniently viewed.

In order to achieve the aforementioned objects, the present invention provides a logistics monitoring and controlling system for monitoring and controlling transportation of material using a global positioning subsystem. The logistics monitoring and controlling system comprises: a central managing device for managing information on vehicles serving for an organization, and information on material transported by the vehicles; a vehicle information inputting device for inputting the information on the vehicles to the central managing device; a material information inputting device for inputting the information on the material transported by the vehicles to the central managing device; a central monitoring device for monitoring transportation of the material by tracking movement of the vehicles; and a global positioning subsystem for providing current locations of the vehicles serving for the organization.

The present invention also provides a logistics monitoring and controlling method for monitoring transportation of material using a global positioning subsystem, the method comprising the steps of: (i) inputting information on a vehicle serving for an organization to a central managing device via a vehicle information inputting device; (ii) inputting information on material transported by the vehicle via a material information inputting device when the vehicle sets out; (iii) a monitoring platform in a central monitoring device sending a request to the global positioning subsystem for current location information on the vehicle; (iv) the global positioning subsystem obtaining the current location information on the vehicle; (v) the global positioning subsystem sending the current location information on the vehicle to the central monitoring device via a network; and (vi) the central monitoring device checking whether a current location of the vehicle is along a predetermined route of the vehicle. Further, the logistics monitoring and controlling method comprises the step of sending an alarm from the central monitoring device if the current location of the vehicle is not along the predetermined route.

Other objects, advantages and novel features of the present invention will be drawn from the following detailed description of preferred embodiments of the present invention with the attached drawings, in which:

BRIEF DESCRIPTION OF THE DRAWINGS

FIG. 2 shows a vehicle information table in accordance with the system of FIG. 1;

FIG. 3 shows a material information table in accordance with the system of FIG. 1;

DETAILED DESCRIPTION OF PREFERRED EMBODIMENTS OF THE INVENTION

Figure 1:
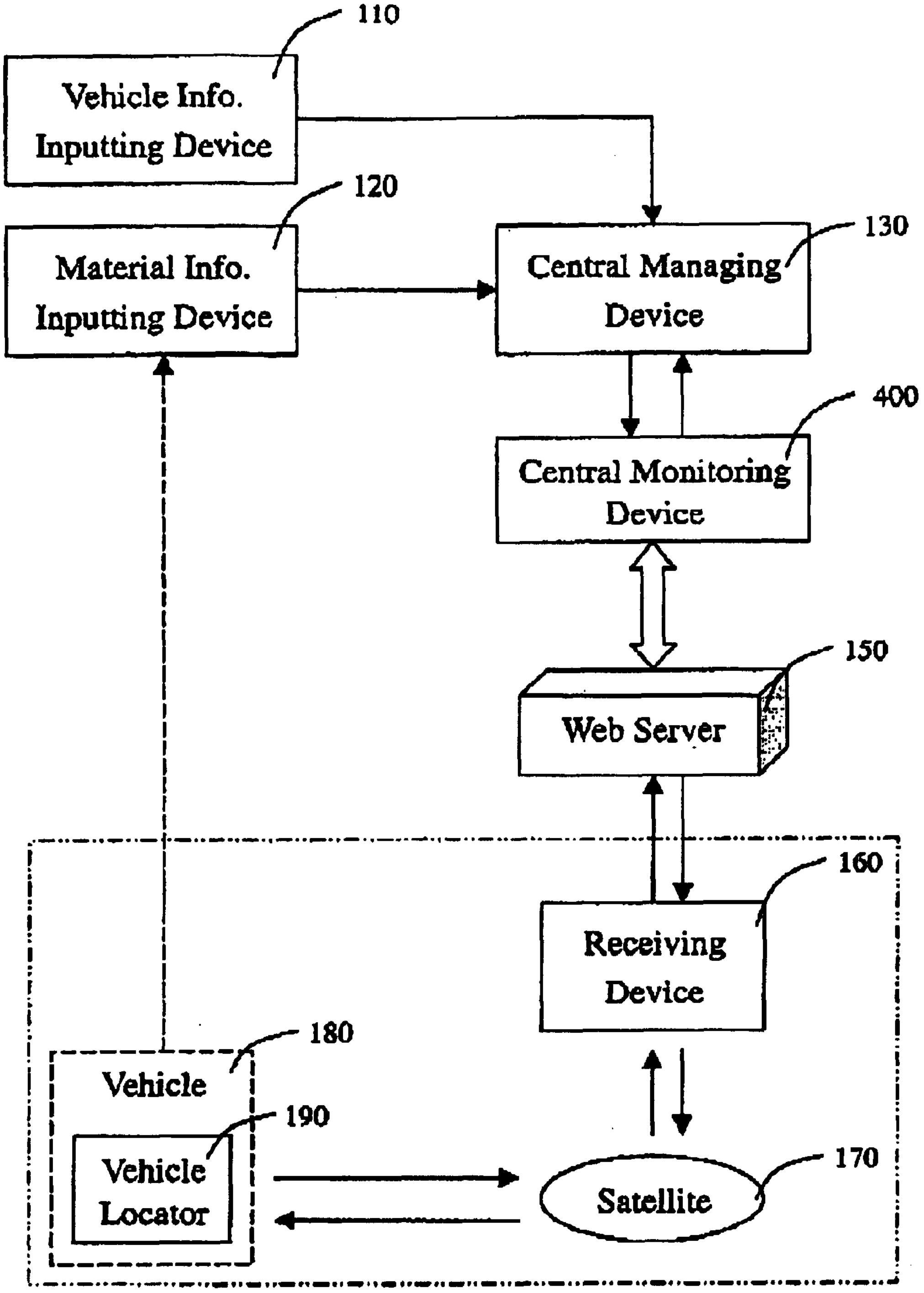
FIG. 1 is a schematic diagram of infrastructure of a logistics monitoring and controlling system employing a global positioning subsystem in accordance with a preferred embodiment of the present invention.

FIG. 1 is a schematic diagram of infrastructure of a logistics monitoring and controlling system employing a global positioning subsystem in accordance with a preferred embodiment of the present invention. The logistics monitoring and controlling system primarily comprises a vehicle information inputting device 110 for inputting information on vehicles 180 (only one shown) serving for an organization, a material information inputting device 120 for collecting information on material transported by the vehicles 180, a central managing device 130 for managing the information on the vehicles 180 and the information on the material, and a central monitoring device 400 for monitoring whether a route that a vehicle 180 travels along coincides with a predetermined route. The central managing device 130 links to the vehicle information inputting device 110 and the material information inputting device 120 via an intranet (represented by lines with arrowheads in FIG. 1), and the central monitoring device 400 links to the central managing device 130 via the intranet.

According to the preferred embodiment of the present invention, a global positioning subsystem is employed to obtain location information on the vehicles 180 serving for the organization. The global positioning subsystem comprises a receiving device 160, a satellite 170, and a plurality of vehicle locators 190 (only one shown) fixed to a plurality of the vehicles 180 (only one shown) serving for the organization. When receiving a request for location information on a vehicle, the receiving device 160 of the global positioning subsystem transmits the request to the satellite 170. Then the satellite 170 transmits the request to the vehicle locator 190 of the vehicle 180. Afterward, the vehicle locator 190 ascertains location of the vehicle 180 using a conventional GPS module, and sends location information on the vehicle 180 to the satellite 170. The satellite 170 receives the location information sent from the vehicle locator 190, and transmits the location information to the receiving device 160 on the ground. The receiving device 160 receives the location information, and sends the location information to a web server 150. The central monitoring device 400 can access the location information in the web server 150 through the intranet.

The central monitoring device 400, the web sewer 150 and the receiving device 160 are linked with a communication network, which can be an intranet or the Internet or a combination thereof FIG. 2 shows a vehicle information table 200 for recording information on the vehicles 180. The information includes license plate number 210, owner of vehicle 220, vehicle group 230, type of vehicle 240 and Subscriber Identity Module (SIM) number 250. License plate number 210 is a standard identification number of a vehicle 180. Owner of vehicle 220 shows who owns the vehicle 180. Vehicle group 230 shows which group of vehicles the vehicle 180 belongs to. Type of vehicle 240 indicates which type the vehicle 180 is. SIM number 250 is the number of a SIM card of the vehicle locator 190, and is used by the central monitoring device 400 for identifying the vehicle locator 190.

FIG. 3 shows a material information table 300 for recording information on material transported by the vehicles 180. The material information table 300 records bill of material (BOM) number 310, order number 320, material number 330, material name 340, units of material 350, quantity of material 360, route 370, and license plate number 210. BOM number 310 is used for showing a serial number of a bill recording passage of material. Route 370 shows a route that a vehicle 180 is to travel along when transporting material.

Figure 4:
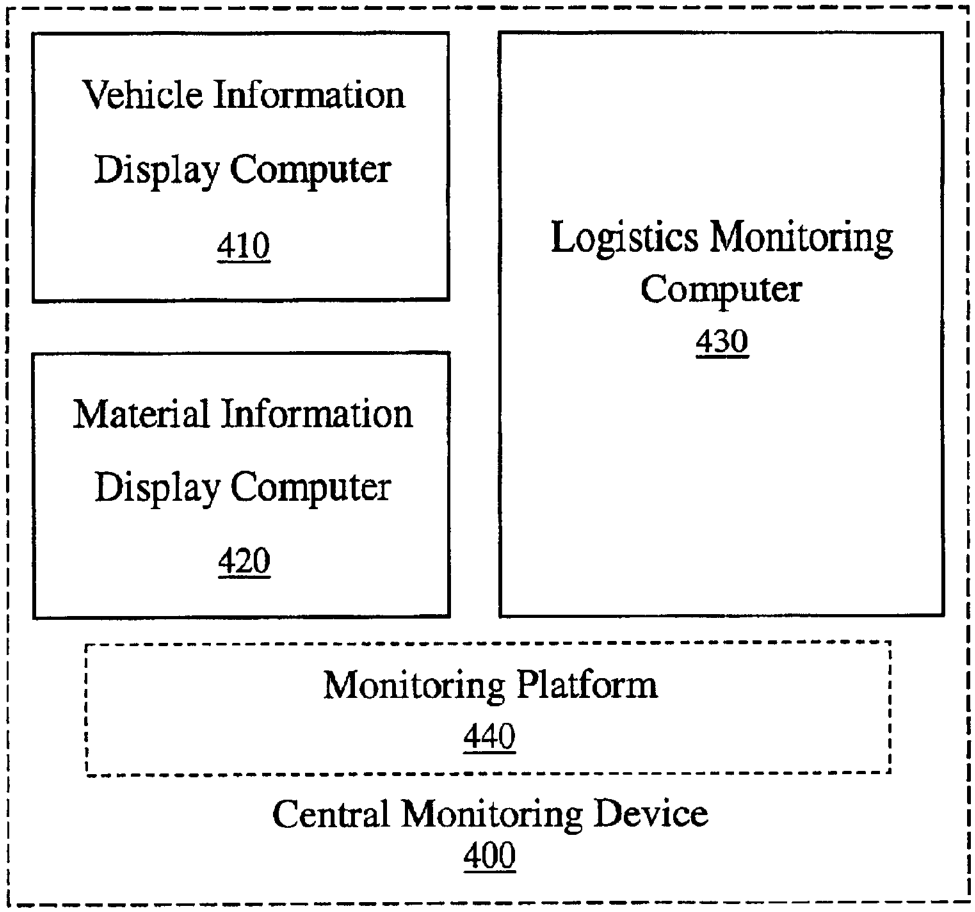
FIG. 4 is a schematic diagram of a central monitoring device in accordance with the system of FIG. 1.

FIG. 4 is a schematic diagram of the central monitoring device 400 in accordance with the preferred embodiment of the present invention. The central monitoring device 400 comprises a vehicle information display computer 410, a material information display computer 420, and a logistics monitoring computer 430. The vehicle information display computer 410 is used to display information on the vehicles 180. The information on the vehicles 180 comprises the information described above in relation to FIG. 2, and information sent from the global positioning subsystem. When a user wants to know current location information on a vehicle 180, he simply selects the vehicle 180 in the vehicle information display computer 410. Thereupon, the needed information is displayed in the vehicle information display computer 410. The material information display computer 420 is used to display information on material transported by the particular vehicle 180 that is selected in the vehicle information display computer 410. The logistics monitoring computer 430 is used for displaying the exact location of the particular vehicle 180 that is selected in the vehicle information display computer 410. The logistics monitoring computer 430 can show an image of the vehicle 180 on a route map, allowing the user to know exactly where the vehicle 180 is in real time. The central monitoring device 400 further comprises a monitoring platform 440 used for sending information to the global positioning subsystem.

Figure 5A:
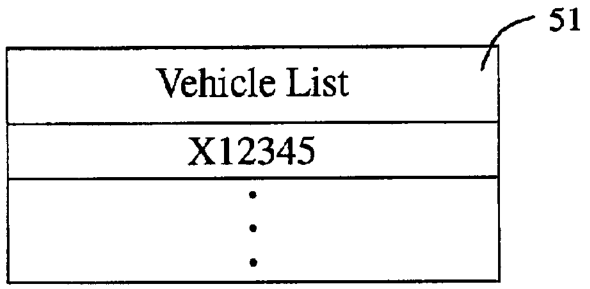
FIG. 5A shows a vehicle list in accordance with the system of FIG. 1.

FIG. 5A shows a vehicle list 51 for users to select a vehicle 180 and send a request relating to that vehicle 180 to the global positioning subsystem. When a user wants to know where a particular vehicle 180 is, he can click on a license plate number of the vehicle 180 displayed in the vehicle list 51, whereupon a request for the location of that vehicle 180 is sent to the global positioning subsystem automatically.

Figure 5B:
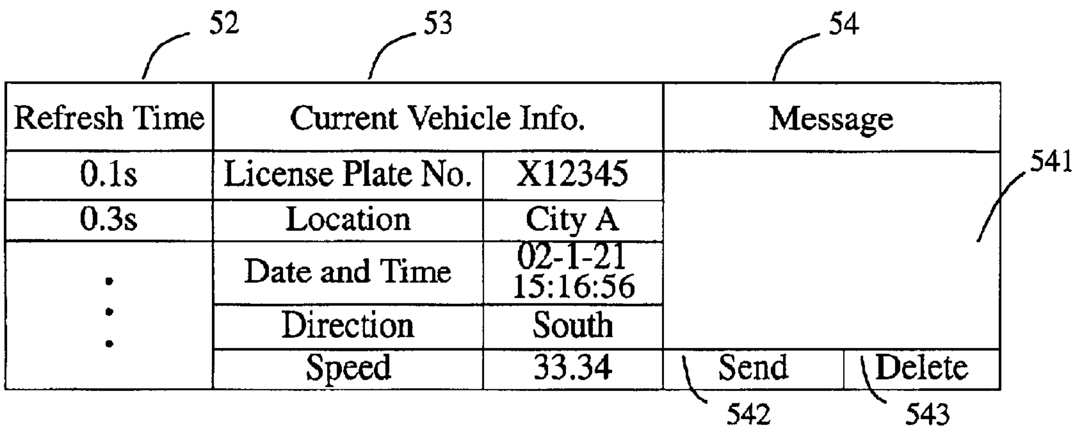
FIG. 5B is a table showing information on a vehicle that a user selected from the vehicle list of FIG. 5A.

FIG. 5B is a table showing information on a vehicle 180 that a user selected from the vehicle list 51 of FIG. 5A. The information in FIG. 5B includes refresh time 52, current vehicle information 53, and message 54. Refresh time 52 shows how often the logistics monitoring and controlling system provides up-to-date information displayed in the central monitoring device 400. Current vehicle information 53 comprises license plate number of the vehicle 180, current location of the vehicle 180, current date and time, current direction of the vehicle 180, and current speed of the vehicle 180. Message 54 enables the user to send a message to the vehicle locator 190 of the vehicle 180. The user can write a message in the blank space 541, and send the message to the vehicle 180 by clicking on the 'send' button 542. The user can cancel a written message by clicking on the 'delete' button 543.

Figure 6:
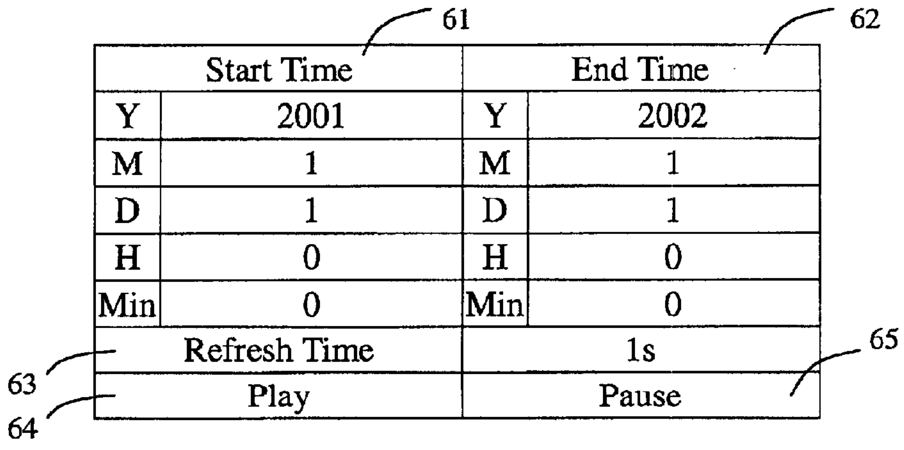
FIG. 6 is a parameter selection table for replaying a route that a vehicle has actually traveled along, in accordance with the system of FIG. 1.

If a vehicle 180 does not arrive at a predetermined destination in time, a user can replay a route along which the vehicle 180 has traveled to look for the vehicle 180. Referring to FIG. 6, when the vehicle 180 is selected from the vehicle list 61, the user can select a time period by inputting time parameters to a start time column 61 and an end time column 62. The user then inputs a refresh cycle time in a refresh time 63 item, and clicks a 'play' button 64. The vehicle 180 is displayed superimposed on an applicable route map of the region in the logistics monitoring computer 430. The displayed vehicle 180 moves along the map according to the refresh cycle time that was input, thus showing the route that the vehicle 180 traveled along in the selected time period. This helps the user find a current location of the vehicle 180. The user (can also click on a 'pause' button 65, whereupon the display of the vehicle 180 in the logistics monitoring computer 430 is frozen. When the 'pause' button 65 is clicked on, the refresh cycle time is automatically reset to a predetermined default value.

Figure 7:
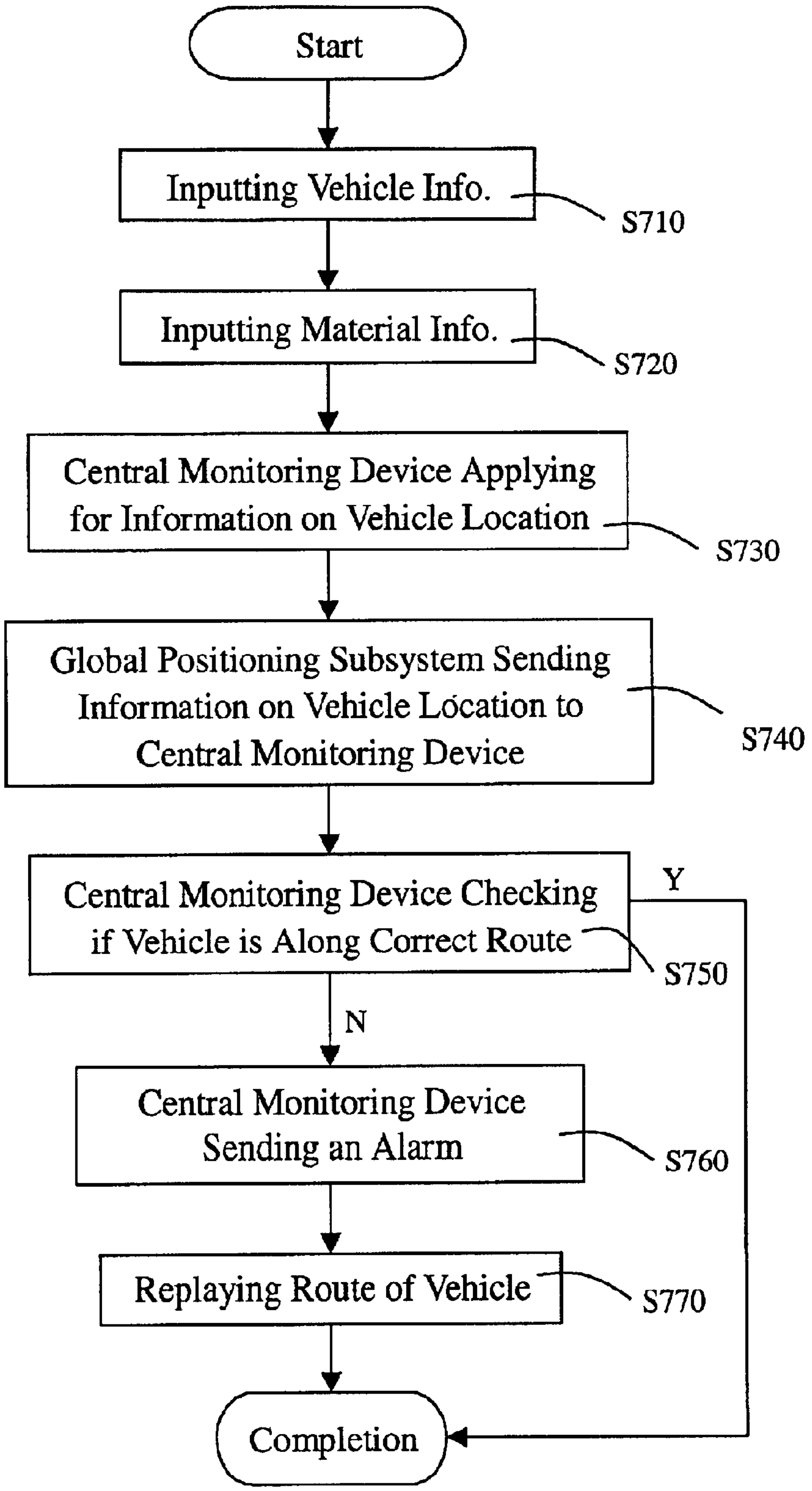
FIG. 7 is a flow chart of monitoring logistics in accordance with a preferred embodiment of the present invention.

FIG. 7 is a flow chart of monitoring logistics in accordance with a preferred embodiment of the present invention. When a vehicle 180 joins an organization for logistics purposes, information on the vehicle 180 is input into the central managing device 130 via the vehicle information inputting device 110 (step S710). The information input is that described above in relation to FIG. 2. The information on the vehicles 180 in an organization is managed in the central managing device 130.

When a vehicle 180 transporting material sets out, information on the material transported is input to the central managing device 130 via the material information inputting device 120 for management purposes (step S720). The information input is that described above in relation to FIG. 3. The information on the material transported correlates to the information on the vehicle 180 that transports the material via the license plate number 210.

When a user wants to know whether a location of a vehicle 180 is on a correct predetermined route of the vehicle 180, the user can send a request for location information on the vehicle 180 to the global positioning subsystem via the central monitoring device 400 (step S730). For example, when the user wants to know location information on the vehicle 180 numbered 'X12345,' he simply clicks on the column 'X12345' in the vehicle list 51 (see FIG. 5A) in the vehicle information display computer 410. Thereupon a request for location information on the vehicle 180 is sent to the global positioning subsystem via the monitoring platform 440 of the central monitoring device 400.

After receiving the request for location information on the vehicle 180 numbered 'X12345,' the global positioning subsystem ascertains a location of the vehicle 180 and sends the location information back to the central monitoring device 400 (step S740). The location information sent back is displayed in the table shown in FIG. 5B. Meanwhile, an exact location of the vehicle 180 is displayed on a map in the logistics monitoring computer 430. At the same time, the central monitoring device 400 checks whether the location of the vehicle 180 is along the predetermined route of the vehicle 180 (step S750). The central monitoring device 400 does this by comparing the vehicle information and the material information with the current location information on the vehicle 180. If the vehicle 180 is not traveling along the predetermined route, the central monitoring device 400 sends an alarm (step S760). The alarm may take any one or more of a variety of forms, such as a sonic alarm or a visual alarm. A visual alarm may, for example, be a flashing red lamp.

If the central monitoring device 400 sends an alarm, the user can send a message to the driver of the vehicle 180. The message is used to guide the driver to follow the predetermined route. The user can write the message in the blank 541 shown in FIG. 5B, and then click on the 'send' button 542. Thus the message is sent by the monitoring platform 440 to the vehicle locator 190 on the vehicle 180 according to the SIM number thereof, and displayed on an LCD of the vehicle locator 190. If the vehicle 180 does not arrive at a predetermined destination in time, the user can replay the route along which the vehicle 180 has traveled to look for the vehicle 180, as described above (step S770).

Figure 8:
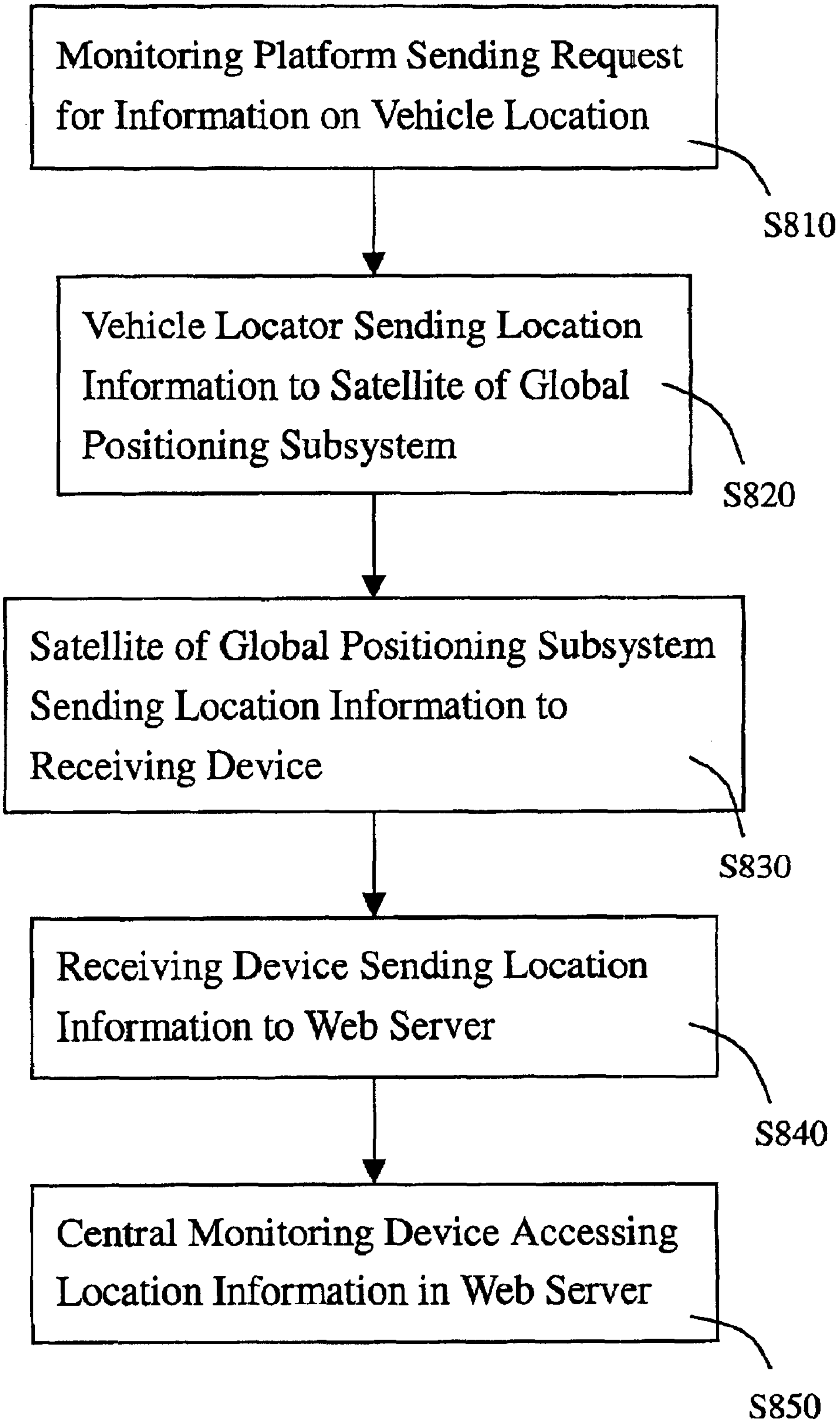
FIG. 8 is a flowchart of the global positioning subsystem providing location information on a vehicle to the central monitoring device in accordance with the preferred embodiment of the present invention.
Figure 9:
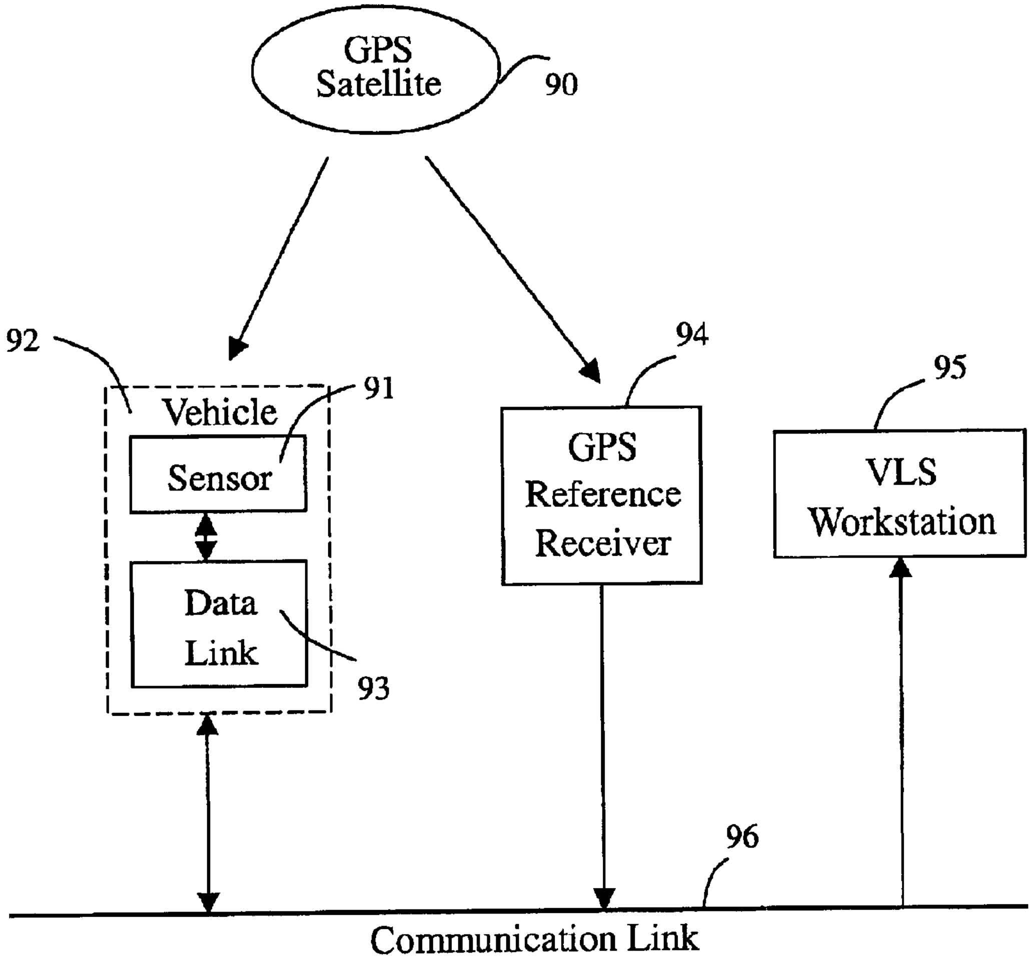
FIG. 9 (PRIOR ART)
FIG. 9 is a schematic diagram of infrastructure of a conventional vehicle tracking system employing a global positioning system.

FIG. 8 is a flowchart of the global positioning subsystem providing location information on a vehicle 180 to the central monitoring device 400 in accordance with the preferred embodiment of the present invention. In the process of monitoring logistics, when a user clicks on the column 'X12345' in the vehicle list 51, the monitoring platform 440 automatically sends a request for location information on the vehicle 180 numbered 'X12345' to the vehicle locator 190 of that vehicle 180 (step S810). After receiving the request for location information, the vehicle locator 190 of the vehicle 180 sends the location information to the satellite 170 of the global positioning subsystem (step S820). The location information comprises license plate number, location, current time, direction and speed of the vehicle 180.

After receiving the location information sent from the vehicle locator 190, the satellite 170 transmits the location information to the receiving device 160 on the ground (step S830). Then the receiving device 160 transmits the location information to an appointed web server 150 (step S840). The central monitoring device 400 can access the location information in the appointed web server 150 directly (step S850).

Although only preferred embodiments of the present invention have been described in detail above, those skilled in the art will readily appreciate that many modifications to the preferred embodiments are possible without materially departing from the novel teachings and advantages of the present invention. Accordingly, all such modifications are deemed to be covered by the following claims and allowable equivalents of the claims.

What is claimed is:

1. A logistics monitoring and controlling system for monitoring transportation of material, the system comprising:

a central managing device for managing information on vehicles serving for an organization and information on material transported by the vehicles;

a vehicle information inputting device for inputting the information on the vehicles to the central managing device;

a material information inputting device for inputting the information on the material transported by the vehicles to the central managing device;

a central monitoring device for monitoring transportation of the material by tracking movement of the vehicles; and a global positioning subsystem for providing current locations of the vehicles serving for the organization, the global positioning subsystem comprising a receiving device, a satellite, and a plurality of vehicle locators fixed to corresponding vehicles, the global positioning subsystem being linked to the central monitoring device via a network, the network comprising the Internet, an intranet or a combination thereof; wherein the central monitoring device comprises a logistics monitoring computer, a material information display computer, and a vehicle information display computer; wherein the central monitoring device further comprises a monitoring platform for sending a request to a vehicle locator of the global positioning subsystem for current location information on a vehicle corresponding to the vehicle locator.

2. The logistics monitoring and controlling system as claimed in claim 1, wherein the vehicle locators are provided for sending location information on the vehicles to the satellite of the global positioning subsystem.

3. The logistics monitoring and controlling system as claimed in claim 2, wherein the vehicle locators have Subscriber Identity Module cards for identification of the vehicle locators by the central monitoring device.

4. The logistics monitoring and controlling system as claimed in claim 2, wherein the receiving device of the global positioning subsystem is provided for receiving the location information on the vehicles sent from the satellite of the global positioning subsystem.

5. The logistics monitoring and controlling system as claimed in claim 1, wherein the vehicle information display computer and the material information display computer in the central monitoring device are linked to the central managing device for accessing information on the vehicles and information on the material.

6. The logistics monitoring and controlling system as claimed in claim 1, wherein information on each of the vehicles comprises license plate number, owner of the vehicle, group of the vehicle, vehicle type, and SIM card number of a vehicle locator fixed on the vehicle.

7. The logistics monitoring and controlling system as claimed in claim 1, wherein the information on the material comprises bill of material number, order number, material number, material name, units of material, quantity, and route for transportation.

8. A logistics monitoring and controlling system for monitoring transportation of material, the system comprising:

a central managing device for managing information on vehicles serving for an organization and information on material transported by the vehicles;

a vehicle information inputting device for inputting the information on the vehicles to the central managing device;

a material information inputting device for inputting the information on the material transported by the vehicles to the central managing device;

a central monitoring device for monitoring transportation of the material by tracking movement of the vehicles; and a global positioning subsystem for providing current locations of the vehicles serving for die organization, the global positioning subsystem comprising a receiving device, a satellite, and a plurality of vehicle locators fixed to corresponding vehicles, the global positioning subsystem being linked to the central monitoring device via a network, the network comprising the Internet, an intranet or a combination thereof; wherein the vehicle locators are provided for sending location information on the vehicles to the satellite of the global positioning subsystem.

9. The logistics monitoring and controlling system as claimed in claim 8, wherein the vehicle locators have Subscriber Identity Module cards for identification of the vehicle locators by the central monitoring device.

10. The logistics monitoring and controlling system as claimed in claim 8, wherein the receiving device of the global positioning subsystem is provided, for receiving the location information on the vehicles sent from the satellite of the global positioning subsystem.

* * * * *